July 6, 1937.　　G. F. WIKLE ET AL　　2,086,374
APPARATUS FOR CUTTING STOCK
Filed April 15, 1936　　3 Sheets-Sheet 2

INVENTORS
GEORGE F. WIKLE
CHARLES S. LENNOX
BY
ATTORNEY.

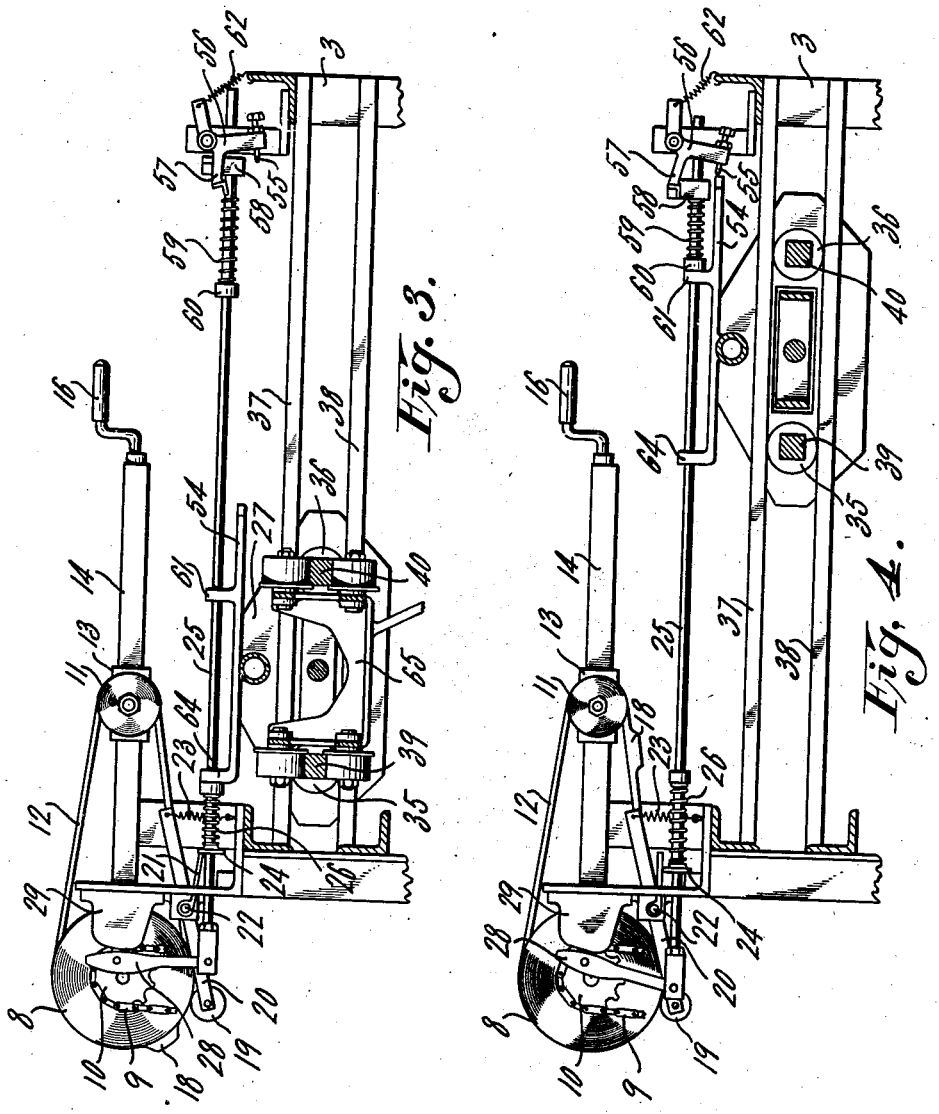

Patented July 6, 1937

2,086,374

UNITED STATES PATENT OFFICE 2,086,374

APPARATUS FOR CUTTING STOCK

George F. Wikle and Charles S. Lennox, Detroit, Mich., assignors to United States Rubber Products, Inc., New York, N. Y., a corporation of New York Application April 15, 1936, Serial No. 74,444

19 Claims. (Cl. 164—73)

This invention relates to an apparatus for cutting strip material into predetermined lengths, and more particularly it relates to an apparatus for cutting into proper length rubber treads such as are used in the manufacture of pneumatic tires.

Treads for pneumatic tires are usually cut by a manual operation, and therefore the accuracy of cutting the treads to proper length is entirely dependent upon the operator.

According to our invention, we purpose to cut the treads to proper length while the tread is in continuous movement along a conveyor belt. Thus, the cutting operation will in no way interfere with the normal progress or movement of the tread during the processing of the tread as part of the operation of manufacturing pneumatic tires.

An object of this invention is to provide automatic means for cutting treads transversely during the continuous movement of the tread strip.

A further object is to obtain accuracy in cutting the treads to proper length, and to provide adjustment so that the lengths of the tread strips may be varied in accordance with desired requirements.

A further object is the attainment of an efficient and economical apparatus for cutting treads.

These and other objects and advantages will appear more fully in the following detailed description which is to be considered in connection with the accompanying drawings, in which:—

Figs. 3 and 4 are elevational views illustrating the tripping mechanism for actuating the tread cutting operation.

Figure 1:
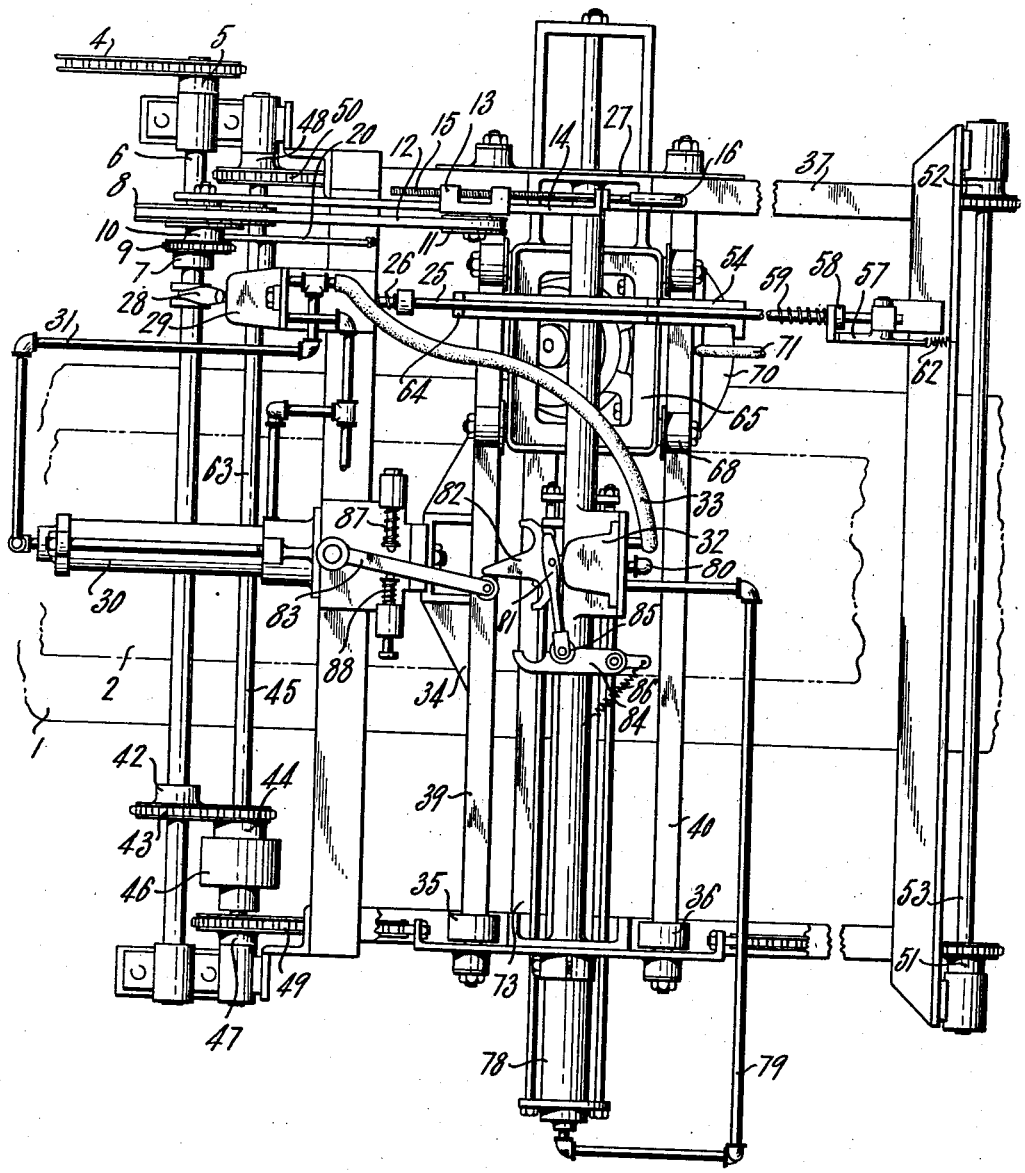
Fig. 1 is a plan view, illustrating an embodiment of my invention.
Figure 2:
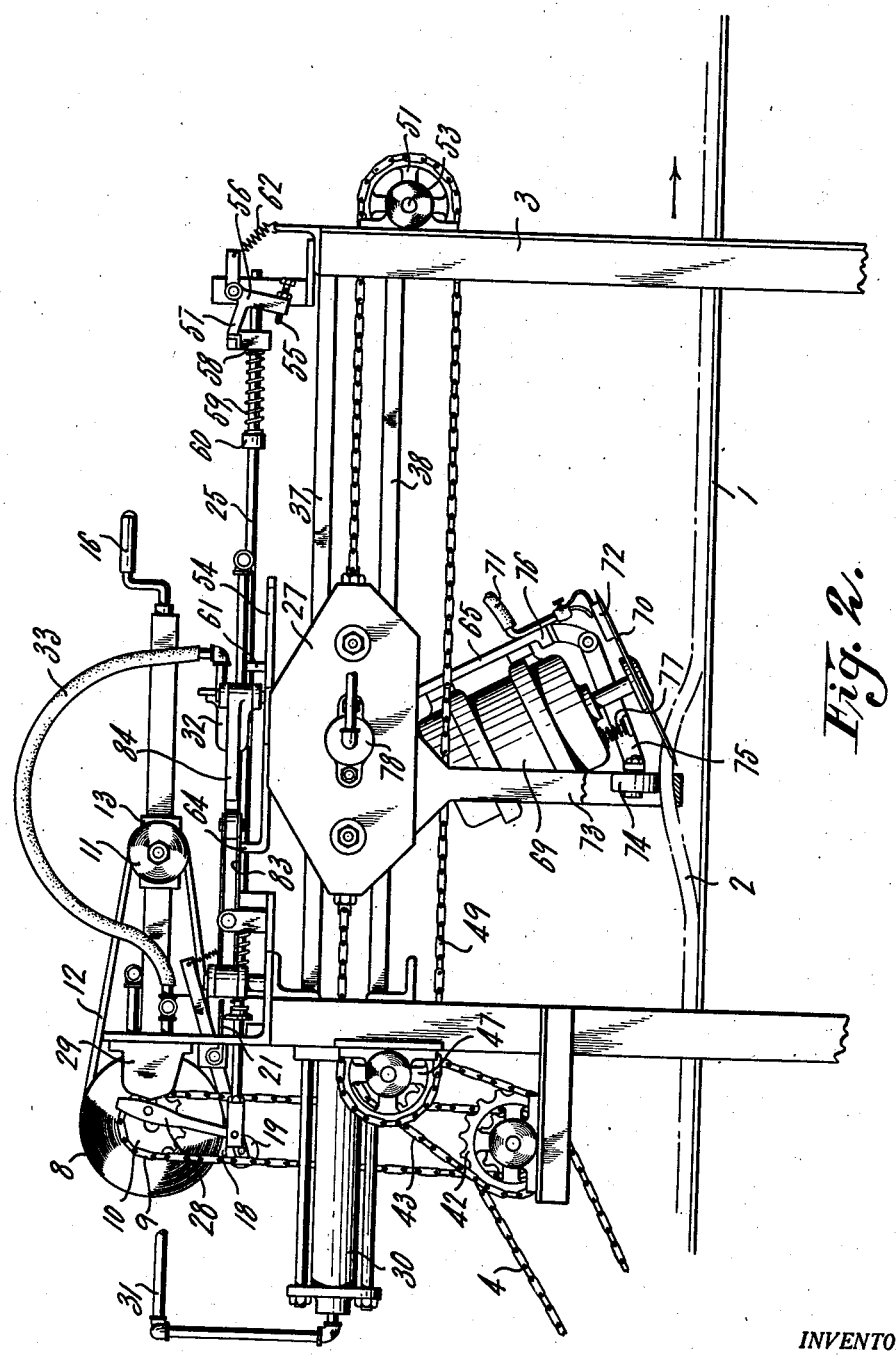
Fig. 2 is a side elevational view thereof.

Referring in particular to Figs. 1 and 2, we show an embodiment of our invention in operative relation to a tread conveyor.

A conventional type of conveyor mechanism (not shown) includes a conveyor belt 1 supporting a continuous strip of rubber tread 2, and normally moving continuously in a direction shown by the indicating arrow. The stock cutting apparatus includes a structural frame 3 arranged to support a cutting disc above the conveyor belt 1. The cutting disc is mounted to move longitudinally with the stock during each cutting operation and to return to the same longitudinal position after each cut. The disc alternates in its movement laterally of the stock in successive cutting operations. To this end the cutting disc is supported by a double carriage construction with both carriage units under the control of a single timing unit. The source of power which operates the conveyor belt 1 also cooperates with a timing device for determining the distance between the tread cuts.

Drive and timing unit

A chain 4 connects with the conventional conveyor driving means, and meshes with a sprocket 5 secured to a shaft 6 supported from the frame 3. A second sprocket 7, also connected to the shaft 6, connects the relative conveyor motion to a timing sheave 8 through a chain 9 and sprocket 10 associated with the sheave 8. An adjustable sheave 11 is positioned in spaced relation with the timing sheave 8, and a timing belt 12 cooperates with the sheaves 8 and 11. Sheave 11 is supported from the bracket 13 adjustably mounted on an arm 14 extending from the frame 3. An adjusting screw 15, including a hand operable crank 16, engages with the block 13 for adjustably positioning it along the arm 14.

The belt 12 is composed of flexible material such as rubber so that the distance between the sheaves 8 and 11 may be varied to any degree without the necessity of changing belts. The belt 12 includes a cam projection 18 which is cooperable with a cam roller 19 attached to a pivotal arm 20. A downward movement of the cam roller 19 produced by the cam projection 18 causes an upward movement of a trip finger 21 secured to a pivot pin 22 attached to the arm 20. A spring 23 normally retains the cam roller 19 in engagement relation relative to the cam projection 18.

The upward movement of the finger 21 disengages with a collar 24 attached to a slidable valve control rod 25. A spring 26, through which a rod 25 extends, engages at one end with a carriage frame 27, and at the other end with the collar 24. The carriage frame 27 is held in inoperative position, as shown in Fig. 3, by means hereinafter described. Therefore, the spring 26, being under compression, exerts a pressure against the collar 24 to cause the rod 25 to move longitudinally to the left. The left end of the rod 25 engages with a lever 28 for actuating a valve mechanism within a valve housing 29. The longitudinal movement along the rod 25 thus actuates the valve mechanism within the housing 29. As a result of this actuation fluid under pressure is introduced into an air cylinder 30 through conduits 31. At the same time fluid pressure is also introduced into a valve housing 32 through the flexible conduit 33. As a result of this valve actuation the air cylinder 30 causes the carriage 27 to move in the direction of the tread conveyor.

Longitudinal movement

The piston operating in the air cylinder 30, through the bracket 34 (Fig. 1), connects with the frame of the carriage 27. As shown in Fig. 4, the carriage 27 is longitudinally movable through the assistance of wheels 35 and 36 which engage with track rails 37 and 38 secured to the frame 3.

The purpose of the carriage 27 is to provide a supporting means movable with the conveyor, for supporting transverse track rails 39 and 40 positioned transversely relative to the conveyor and adaptable for guiding a transversely movable carriage 65.

It is essential that the carriage 27 move along with and at the same speed as the conveyor. In order to obtain this correct relative movement, we provide the air cylinder 30 which is normally capable of moving the carriage at a greater rate of speed than the conveyor. We also provide a restricting means for reacting against the air cylinder 30 so as to prevent movement of the carriage at a greater rate of speed than the speed of the conveyor itself. This is accomplished by connecting the carriage 27 with the same source of driving means associated with the conveyor, and providing means for resisting movement of the carriage to restrict its rate of movement to a speed not greater than the speed of the conveyor belt. To attain this condition, we provide a sprocket 42 and a chain 43 adapted for association with a sprocket 44 rotatable on a shaft 45 supported by the frame 3.

The hub of the sprocket 45 associates with a clutch 46 of the ball ratchet type, such as the conventional type of clutch, for permitting movement in one direction. The clutch 46 is secured in part to the shaft 45, and sprockets 47 and 48 attached to the shaft 45 mesh with chains 49 and 50, respectively. These chains 49 and 50 mesh with idler sprockets 51 and 52, respectively, mounted on a shaft 53 supported by the frame 3. The reach of the chains 49 and 50 is broken, and the carriage 27 is interposed therebetween and secured to the chain links. In this manner of assembly, the carriage 27 is subject to positive movement parallel with the conveyor and at the same rate of speed.

As the carriage 27 moves along with the conveyor, the transverse tread cutting means, hereinafter described, is set into operation. When the carriage 27, as shown in Fig. 4, reaches the end of its stroke, trip mechanism is actuated to cause the return of the carriage to its original or normal position, shown in Fig. 3. At the end of the carriage stroke an arm 54 extending from the frame of the carriage 27 strikes an adjusting screw 55 threaded at one end of a pivotal lever 56. A trip arm 57 joining with the lever 56 cooperates with a latch lug 58 secured to the rod 25. When the carriage is in operating position, that is, while traveling in the direction of the conveyor, the trip arm 57 is engaged with the latch lug 58.

A spring 59 surrounding the rod 25 is positioned between the latch lug 58 and a collar 60 slidable on the rod 25. As the carriage 27 moves toward the ends of the stroke, a projection 61 forming part of the frame of the carriage 27 strikes the collar 60 and compresses the spring 59. As the carriage 27 continues its movement, the arm 54 strikes the adjusting screw 55, causing the trip arm 57 to swing on its pivot in a downward motion, and thus release engagement of the trip arm 57 with the latch lug 58. When the latch lug 58 is released, the spring 59, being in a state of compression, forces the latch lug 58 to move longitudinally to the right, carrying with it the slidable rod 25.

A spring 62 acts upon the trip arm 57 to maintain it in its normal upward position. The longitudinal movement of the rod 25 actuates the valve lever 28 to reverse the operation of the valves within the valve housing 29, and reverses the movement of the piston within the air cylinder 30. Conduits 63 connect the valve housing 29 with the air cylinder 30 to effect a reverse movement of the carriage 27.

As the carriage 27 moves toward its normal, inoperative position, a lug 64 forming a part of the frame of the carriage 27 compresses the spring 26 while the collar 24 restrains further longitudinal movement of the rod 25 by engagement with the trip finger 21. When the carriage 27 reaches the position shown in Fig. 3, the piston within the cylinder 30 reaches the end of its stroke, and holds the carriage in such position until the cam lug 18 again actuates with the cam roller 19 to repeat a similar cycle of operation.

*Lateral movement*

The carriage 27 operates longitudinally of the conveyor belt 1 and supports a secondary carriage 65 (Fig. 3) which operates transversely relative to the conveyor belt. The carriage 27 supports rails 39 and 40 for cooperation with flanged wheels 68 rotatably attached to a secondary carriage 65. This carriage 65 supports the means for cutting the stock, preferably tread stock, transversely, and angularly relative to its thickness.

Referring to Fig. 2, essentially, the cutting mechanism primarily consists of a motor 69 directly connected to a cutter disc 70. The motor 69 runs continuously during the operation of the cutting apparatus. Preferably, the cutter 70 is lubricated, as by means of a continuous flow of water entering through a conduit 71 and distributed on the cutter wheel 70 through the assistance of an absorbent body 72 lightly held in contact with the cutter wheel 70.

It is essential that the stock 2 should be cut at a proper angle relative to the tread thickness. This is accomplished by raising the stock 2 upwardly from the conveyor belt 1 by means of a depending hook 73 to the carriage 27 and extending under the tread 2.

In order to maintain the correct position of the stock 2 relative to the cutter wheel 70, a roller 74 is provided to exert a slight pressure on its top. The roller 74 is secured to a pivotal arm 75 attached to a motor support 76 connecting the secondary carriage 65. A spring 77 provides the desired pressure for holding the roller 73 against the stock 2. The cutter wheel 70 completely severs the stock 2 during transverse movement of the secondary carriage 65. Subsequent cuts of the stocks are made in alternate directional movements of the carriage 65.

Transverse actuation of the secondary carriage 65 is produced by a double acting air cylinder 78, having conduits 79 and 80 communicating with a valve housing 32. Fluid pressure to the valve housing 32 is supplied and controlled through the medium of the housing 29 and flexible conduit 33. It is necessary, however, that the housing 32 should operate alternatively in introducing fluid under pressure to either the conduit 79 or the conduit 80, to provide the correct directional movement of the carriage 65. To accomplish this, I provide automatic means for alternatively shifting a valve lever 81 for controlling valves within the valve housing 32.

A rocker arm 82 is attached to the valve lever 81, and cooperates with a pivoted arm 83 which operates to move the rocker arm 82 alternately from one position to another. As the rocker arm 82 is moved into position by the pivotal arm 83, the valve lever 81 holds the rocker arm 82 in that position by means of a tension arm 84 cooperating with a roller 85 attached to the valve lever 81. A spring 86 provides the necessary degree of tension.

The pivotal arm 83 is normally positioned longitudinally relative to the conveyor belt by means of springs 87 and 88 acting upon opposite sides of the pivotal arm 83. As the carriage 27, on which the rocker arm 82 and associated mechanism are attached, moves forward and back longitudinally in a cycle of operation, the rocker arm 82 provides in effect a cam for engaging with the pivotal arm 83 to move the rocker arm 82 alternately from one position to the other. In this manner of operation the cam lug 18 operates initially to actuate the valves within the valve housing 29, which operation results in a longitudinally forward and backward cycle of movement of the carriage 27, and simultaneously results in a single transverse movement of the carriage 65, permitting the reverse transverse movement of the carriage 65 to take place during the next cycle of movement of the longitudinally operating carriage 27.

In the initial operation of the cutting apparatus the motor 69 is set into operation so as to rotate the cutter wheel 70 continuously while the cutter apparatus is being used. The remaining mechanism operates automatically in accordance with movement of the conveyor belt 1, as the source for driving the conveyor also drives timing devices for controlling the cycle of operation. The timing belt 12, being composed particularly of elastic material is adjustable in length to a very accurate degree, thus providing an accurate control in cutting the treads or other stock to proper length.

While the cutting of rubber tread stock has been described in the present application, it is to be understood that the use of the apparatus is not limited to the cutting of any particular stock.

While we have shown and described a preferred embodiment of our invention, it will be understood that modifications may be made therein without departing from the spirit of the invention or the scope of the appended claims.

Having thus described our invention, what we claim and desire to protect by Letters Patent is:—

1. An apparatus for cutting strip material comprising a rotary cutter, a conveyor for supporting strip material, a carriage movable a predetermined distance with the conveyor, a secondary carriage supported by and movable transversely of the first-named carriage and means for supporting the rotary cutter in an inclined position on the second-named carriage for movement across the path of the strip material advanced by the conveyor, whereby the material is severed with tapered edges.

2. An apparatus for cutting strip material comprising a rotary cutter, a conveyor for supporting strip material, a carriage movable a predetermined distance with the conveyor, a secondary carriage supported by and movable transversely of the first-named carriage and supporting the rotary cutter, means for moving the rotary cutter across the path of the strip material, and means for raising the strip material from the conveyor and into the path of the rotary cutter.

3. In a cutting machine, the combination with a conveyor for supporting a stock in continuous strip form, and conveyor driving means, of a carriage movable a predetermined distance with the conveyor, independent actuating means for the carriage, and means operable from the conveyor driving means for preventing the carriage from moving at a speed greater than the speed of the conveyor while moving with the stock.

4. In a cutting machine, a conveyor for supporting stock in continuous strip form, driving means therefor, a carriage movable a predetermined distance with the conveyor, means operable from the conveyor driving means for preventing the carriage from moving at a speed greater than the speed of the conveyor, independent actuating means for moving the carriage, and means operable from the conveyor driving means for actuating the carriage moving means to move the carriage in the direction of the conveyor.

5. In a rubber tread cutting machine, a conveyor for supporting a tread in continuous strip form, driving means for the conveyor, a carriage movable a predetermined distance with the conveyor, means operable from the conveyor driving means for preventing the carriage from moving at a speed greater than the speed of the conveyor, independent means for moving the carriage, means operable from the conveyor driving means for actuating the carriage moving means to move the carriage in the direction of the conveyor, and means operable by movement of the carriage for actuating the carriage moving means to reverse the direction of the carriage movement.

6. In a machine of the class described, a conveyor belt for feeding strip material, driving means therefor, means for cutting the strip material and cam means operable by the conveyor driving means for controlling the operation of the cutting means comprising an elastic belt having a cam projection extending therefrom.

7. In a machine of the class described, a conveyor belt and driving means for feeding strip material, means for cutting the strip material, and cam means operable by the conveyor driving means for controlling the cutting means, said cam means comprising a pair of sheaves in spaced relation, and an elastic belt looped around the sheaves and having a cam projection extending therefrom.

8. In a machine of the class described, a conveyor belt and driving means for feeding strip material, means for cutting the strip material, and cam means operable by the conveyor driving means for controlling the cutting means, said cam means comprising a pair of sheaves in spaced relation, and an elastic belt looped around the sheaves and having a cam projection extending therefrom, one of said sheaves being adjustable for the purpose of varying the perimeter of the elastic belt.

9. In a rubber tread cutting machine, the combination with a conveyor and driving means for supporting a tread in continuous strip form of a carriage movable a predetermined distance with the conveyor, cutting means supported by the carriage, means operable from the conveyor driving means for preventing the carriage from moving at a speed greater than the speed of the conveyor, independent means for moving the carriage, and cam means operable by the conveyor driving means for controlling movement of the carriage.

10. In a cutting machine, the combination with a conveyor and driving means for supporting stock in continuous strip form, of a carriage movable a predetermined distance with the conveyor, a second carriage supported by and movable transversely of the first-named carriage, and cam means operable by the conveyor driving means for controlling initial and simultaneous movements of the carriages.

11. In a cutting machine, the combination with a conveyor and driving means for supporting stock in a continuous strip form, of a carriage movable a predetermined distance with the conveyor, a second carriage supported by and movable transversely of the first-named carriage, means operable by the carriage driving means for controlling initial and simultaneous movements of the carriages, automatic means for returning the first-named carriage to its starting point, and means for stopping the second-named carriage at the end of its transverse stroke.

12. In a cutting machine, a conveyor and driving means for supporting stock in continuous strip form, a carriage movable a predetermined distance with the conveyor, a second carriage supported by and movable transversely of the first-named carriage, cutting means carried thereby, means operable by the carriage driving means for controlling initial and simultaneous movements of the carriages, automatic means for returning the first-named carriage to its starting point, means for stopping the second-named carriage at the end of its transverse stroke, and automatic means for reversing the direction of travel of the second-named carriage for each subsequent cycle of operation.

13. In a cutting machine, a conveyor and driving means for supporting a stock in continuous strip form, a carriage movable a predetermined distance with the conveyor, a second carriage supported by and movable transversely of the first-named carriage, cutting means carried thereby, means operable by the carriage driving means for controlling initial and simultaneous movements of the carriages, automatic means for returning the first-named carriage to its starting point, means for stopping the second-named carriage at the end of its transverse stroke, and means operable by the return movement of the first-named carriage for reversing the direction of travel of the second-named carriage for the next subsequent cycle of operation.

14. An apparatus for cutting strip material comprising a rotary cutter, a conveyor and driving means for supporting strip material, a carriage movable a predetermined distance with the conveyor and carrying the cutter, a pneumatic cylinder for moving the carriage, a clutch mechanism coupled between the carriage and the conveyor driving means for limiting the speed of the carriage movement, cam means operable from the conveyor driving means, and valve mechanism operable by the cam means for controlling the movement of fluid to the pneumatic cylinder.

15. An apparatus for cutting strip material comprising a rotary cutter, a conveyor and driving means for supporting strip material, a carriage movable a predetermined distance with the conveyor, a secondary carriage supported by and movable transversely of the first-named carriage and supporting the rotary cutter for movement in a path across the strip material, pneumatic cylinders for moving the carriages, cam means operable from the conveyor driving means, and valve mechanism operable by the cam means for controlling fluid pressure in the pneumatic cylinders.

16. An apparatus for cutting strip material comprising a rotary cutter, a conveyor and driving means for supporting strip material, a carriage movable a predetermined distance with the conveyor, a secondary carriage supported by and movable transversely of the first-named carriage and having means for supporting the rotary cutter for movement in a path across the strip material, pneumatic cylinders for moving the carriages, cam means operable from the conveyor driving means, valve mechanism operable by the cam means for controlling fluid pressure in the pneumatic cylinders, and a separate valve mechanism for controlling the direction of movement of the secondary carriage.

17. An apparatus for cutting strip material comprising a rotary cutter, a conveyor and driving means for supporting strip material, a carriage movable a predetermined distance with the conveyor, a secondary carriage supported by and movable transversely of the first-named carriage and having means for supporting the rotary cutter in an inclined position for movement in a path across the strip material, pneumatic cylinders for moving the carriages, cam means operable from the conveyor driving means, valve mechanism operable by the cam means for controlling fluid pressure in the pneumatic cylinders, a separate valve mechanism for controlling the direction of movement of the secondary carriage, and a control lever associating with the separate valve mechanism and operable upon reverse movement of the first-named carriage.

18. An apparatus for cutting strip material comprising a rotary cutter, a conveyor and driving means for supporting strip material, a carriage movable a predetermined distance with the conveyor, a secondary carriage supported by and movable transversely of the first-named carriage and having means for supporting the rotary cutter in an inclined position for movement in a path across the strip material, pneumatic cylinders for moving the carriages, cam means operable from the conveyor driving means, valve mechanism operable by the cam means for pneumatically actuating the pneumatic cylinders, a separate valve mechanism for controlling the direction of movement of the second-named carriage, a control lever associating with the separate valve mechanism and operable upon reverse movement of the first-named carriage, and means connected to the control lever for locking the separate valve mechanism during the cycle of its operation.

19. An apparatus for cutting strip material comprising a rotary cutter, a conveyor and driving means for supporting strip material, a carriage movable a predetermined distance with the conveyor, a secondary carriage supported by and movable transversely of the first-named carriage and having means for supporting the rotary cutter for movement in a path across the strip material, pneumatic cylinders for moving the carriages, cam means operable from the conveyor driving means, valve mechanism operable by the cam means for controlling fluid pressure in the pneumatic cylinders, and a separate valve mechanism dependent upon the first-named valve mechanism for controlling the direction of movement of the second-named carriage.

GEORGE F. WIKLE.
CHARLES S. LENNOX.